Sept. 15, 1964     P. GOODALL     3,148,475
FISH LURE
Filed Feb. 14, 1963     3 Sheets-Sheet 1
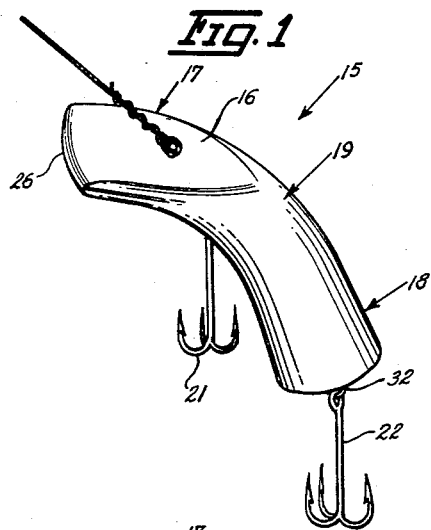
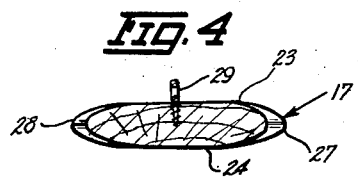
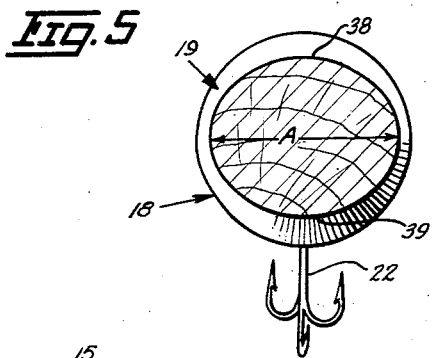
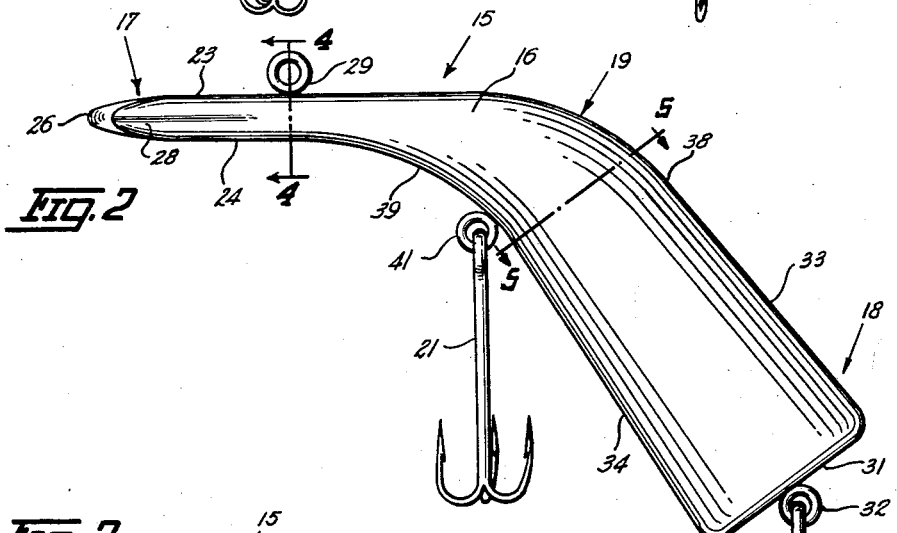
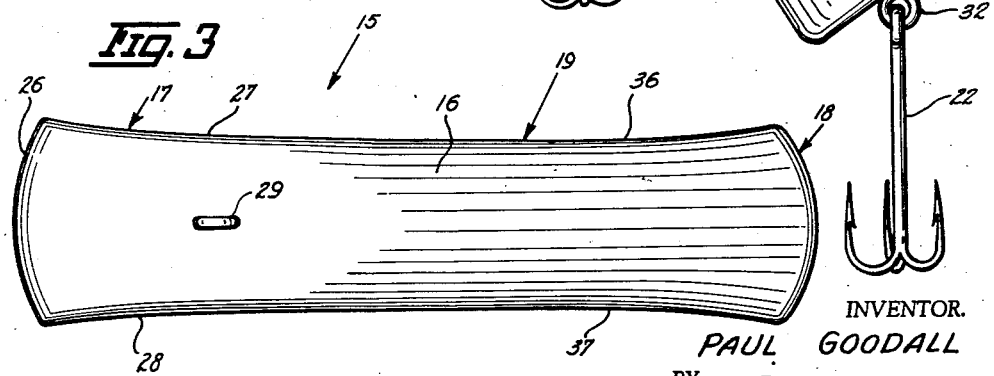
INVENTOR.
PAUL GOODALL
BY
ATTORNEY.

Sept. 15, 1964          P. GOODALL          3,148,475
FISH LURE
Filed Feb. 14, 1963          3 Sheets-Sheet 2
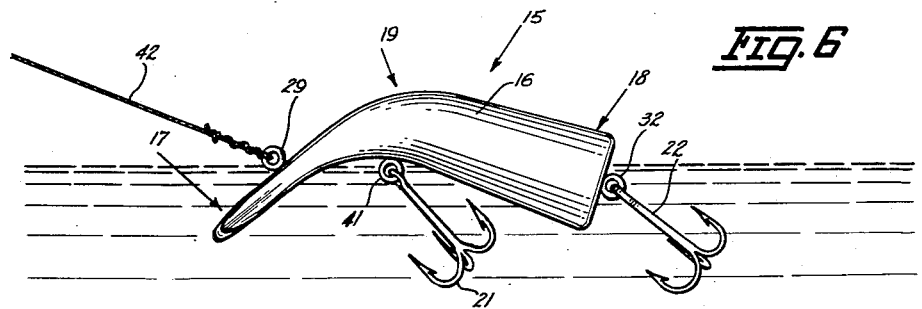
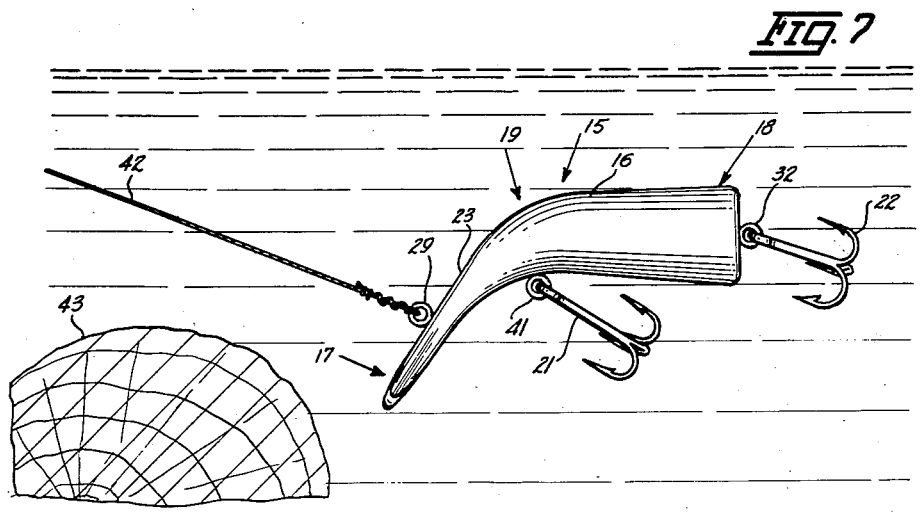
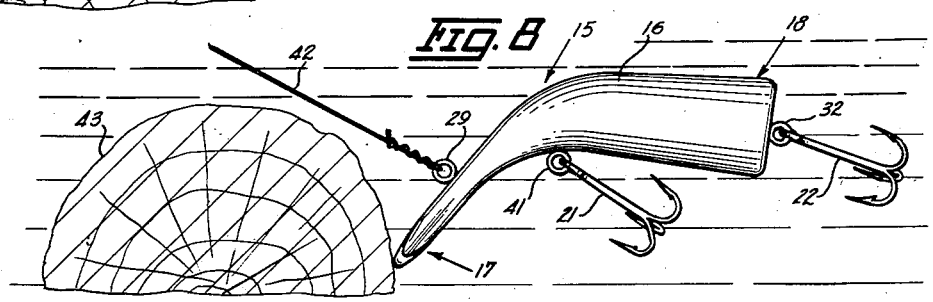
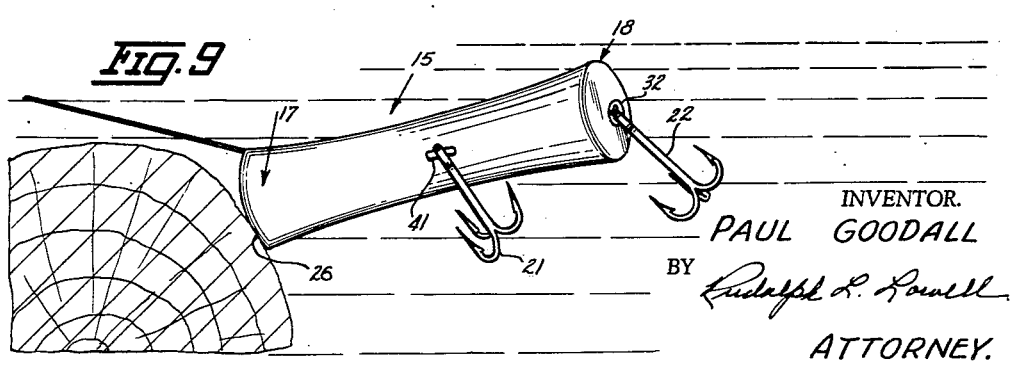
INVENTOR.
PAUL GOODALL
BY
ATTORNEY.

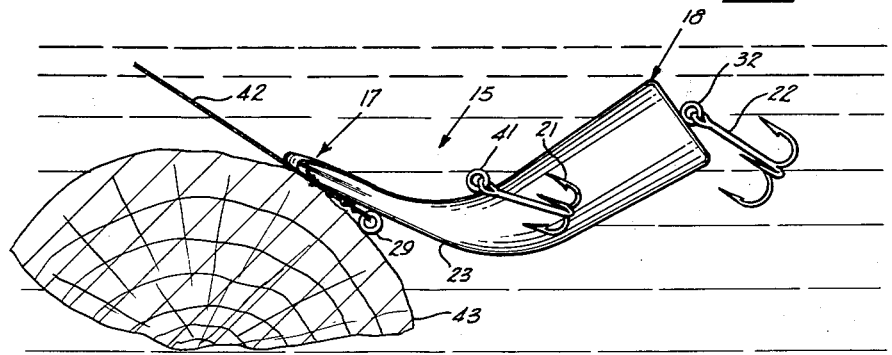
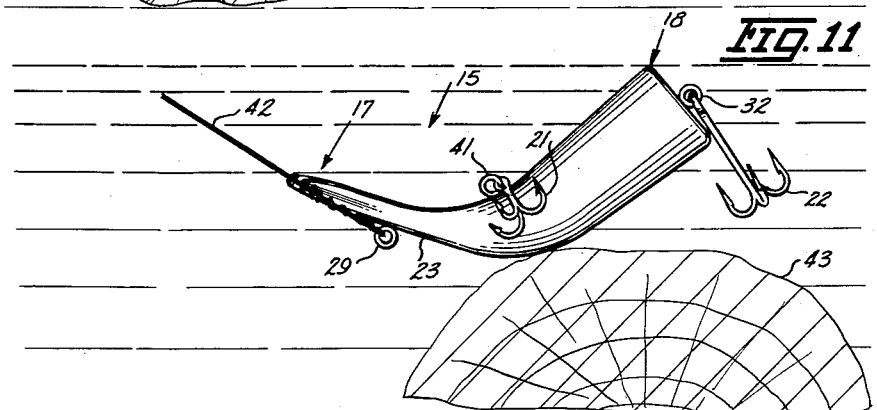
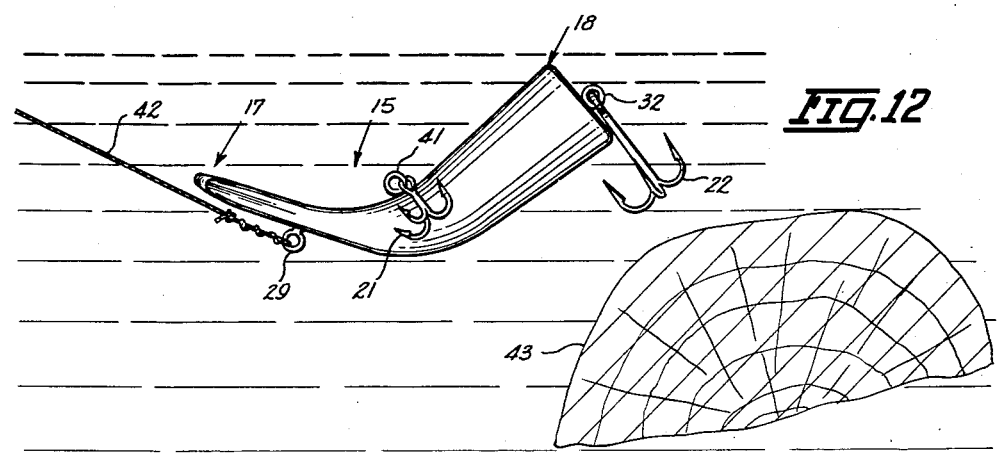

United States Patent Office 3,148,475
Patented Sept. 15, 1964

3,148,475
FISH LURE
Paul Goodall, Walnut Shade, Mo., assignor of fifty percent to Robert L. Meriwether, Des Moines, Iowa
Filed Feb. 14, 1963, Ser. No. 258,427
2 Claims. (Cl. 43—42.48)

This invention relates to fishing equipment and has more particular reference to a plug-type fish lure used in casting and trolling for game fish.

It is the object of the present invention to provide an improved plug-type fish lure which can be effectively retrieved or trolled in water having obstacles such as logs and rocks without snagging the lure.

Another object of the invention is to provide a curved fishing plug which turns on its back when striking a snag as it is pulled in the water to hold the hooks out of engagement with the snag and thus permit its continued travel.

A further object of the invention is to provide an elongated curved fish lure which has a substantially flat nose section and a center of buoyancy in the rear section which holds the rear section above the nose section.

Another object of the invention is to provide a fish lure which can be retrieved or trolled deep in the water or on the surface of the water wherein the submerged drop of the lure is proportioned to its speed of advance.

Still another object of the invention is the provision of a plug-type fish lure which will oscillate or zigzag laterally as it is pulled through the water.

An additional object of the invention is to provide an attractive and enticing fish lure which has non-snagging and jigability characteristics and is reliable and effective in use.

The exact nature of the invention as well as other objects and disadvantages thereof will be readily apparent from the consideration of the following specification relating to the annexed drawing in which:

FIG. 1 is a perspective view of the fish lure embodying the features of the invention;

FIG. 2 is an enlarged side view of the fish lure of FIG. 1;

FIG. 3 is a top view of the fish lure of FIG. 2.

FIG. 4 is a sectional view taken along the line 4—4 of FIG. 2;

FIG. 5 is a sectional view taken along the line 5—5 of FIG. 2;

FIG. 6 is a side view of the fish lure illustrated in FIG. 1 floating on the surface of the water;

FIG. 7 is a side view of the fish lure illustrated in FIG. 1 being pulled through the water; and FIGS. 8 to 12 sequentially illustrate the roll-over action of the fishing lure of the invention as it is pulled over an obstacle in the water.

Referring to the drawing, there is shown in FIG. 1 a plug-type fish lure indicated generally by the reference numeral 15. The lure has a generally elongated arcuate body 16 formed from wood or similarly light material. The body 16 is characterized by a forward flat nose section 17, and a frustrum tail section 18 angularly disposed with respect to the nose section 17. The tail section 18 is integrally united with the nose section 17 by a curved mid-section 19.

A trio of hooks 21 are pivotally mounted on the concave side of the mid-section 19 and suspend downwardly therefrom. A second trio of hooks 22 is pivotally secured to the trailing end of the tail section 18. The hooks 21 and 22 are free for universal swinging movement with respect to the body 16. The weight of the hooks 21 and 22 balances the body 16 in a float position wherein the nose section 17 is inclined in a downward direction. The inclined nose section 17 subjects the lure to a downward pressure as it advances through the water, so as to submerge the lure.

As shown in FIG. 2, the nose section 17 is flat and has parallel top and bottom surfaces 23 and 24 and is a flattened elipse shape in transverse cross section. The leading end 26 of the nose section 17 is rounded and defines a curved surface which is coextensive with the top and bottom surfaces 23 and 24, respectively. As shown in FIG. 3, the leading edge 26 has a transverse arcuate convex shape having a radius of curvature substantially equal to the largest width of the nose section. The opposite side walls 27 and 28 of the nose section 17 taper inwardly and rearwardly from the leading edge 26 toward the rear of the body 16 and thereby progressively reduces the width of the nose section 17 toward the rear of the body 16. A line receiving eyelet 29 is secured to the top surface 23 of the nose section 17 rearwardly of the leading edge 26 along the longitudinal axis of the body 16 a distance substantially equal to the major width of the nose section 17.

The rear section 18 of the body 16 has a generally frustrum shape with the longitudinal axis thereof positioned at an angle of about 45° to 55° with respect to the longitudinal axis of the nose section 17. The rear end section 18 terminates in a circular end wall 31. The diameter of the rear end wall 31 is equal to the major width of the nose section 17. The rear end wall 31 of the tail section 18 is circular, substantially flat and extends normal to the longitudinal axis of the tail section. The hook 22 is pivotally mounted centrally of the end wall 31 by means of an eye screw 32. The top arcuate surface 33, the bottom arcuate surface 34 and the side arcuate surfaces 36 and 37 of the tail section 18 extend upwardly and converge inwardly toward the longitudinal axis of the tail section 18. The taper of the bottom surface 34 and side surfaces 36 and 37 provides the rear section 18 with a frustrum shape.

The nose section 17 and tail section 18 are integrally connected by a curved back or mid-section 19, which is illustrated in FIG. 5 as having an oval or elliptical shape in cross section with the major diameter thereof slightly smaller than the diameter of the tail section 18. The top surface 38 of the back section 19 is convexly curved and coextensively connects the flat top surface 23 of the nose section 17 with the top surface 33 of the tail section 18. As seen in FIG. 2, the bottom surface 39 of the back section 19 defines a concave curve and is coextensive with the bottom surface 24 of the nose section 17 and the bottom surface 34 of the tail section 18.

The body 16 has a smooth contoured appearance which has a generally flattened elliptical cross sectional shaped nose section 17 which gradually changes into an elliptical shaped back section 19 and terminates in a frustrum tail section 18. The hook means 21 is secured to the bottom surface 39 of the back section 19 by an eye screw 41 which is fastened to the central portion of the body 16 along a straight line which passes through the eyelet 29 and the screw eye 32.

The plug-type fish lure of this invention is designed to be used in waters containing logs, rocks, and similar snags. In the art of fishing the fishermen invite or entice the fish out from under the logs and rocks by working the water closely adjacent these snags.

As shown in FIG. 6, the lure 15 floats on the surface of the water prior to its being retrieved or pulled forward. The water line on the body 16 is substantially in the plane formed by the fish line eyelet 29 and the eye screws 32 and 41. In the floating position the nose section 17 extends downwardly into the water and the tail and back sections 18 and 19 lying on the surface of the water with the hooks 21 and 22 extending downward thereunder.

When the lure is drawn through the water, its arcuate shape tends to cause the nose section 17 to descend below the level of the tail section 18, thus raising the tail section of the body 16 above the line of draft of the fish line 42. With the tail section 18 above the line of draft of the fish line 42 the lure is unstable as to balance and will oscillate or zigzag laterally to simulate the swimming action of a minnow. As shown in FIG 7, the lure 15 works itself below the surface of the water as it is advanced in a forward direction. The faster the retrieve the greater will be the pressure of the water on the top surface 23 of the nose section 17 forcing the lure down into the water. An intermittent retrieving action will zigzag the lure laterally and vary the depth of the lure because when the forward motion of the lure is terminated it will float up toward the surface of the water.

The roll-over action of the fish lure 15 for clearing a snag is sequentially illustrated in FIGS. 8 to 12. Referring to FIG. 8, when the nose section 17 engages a snag 43 the pulling force on the fish line 42 pivots the lure 15 about the forward portion of the nose section 17 thereby raising the tail section 18. As seen in FIG. 9 the lure has turned about 90° with the tail section 18 above the line of draft of the fish line 42. The leading edge 26 of the nose section 17 is in engagement with the snag 43. The pulling force of the fish line 42 establishes a combination pivotal and sliding contact between the leading edge 26 and the snag 43. This action tends to pull the lure over the snag and rolls the lure on its back.

As shown in FIG. 10, the lure has completed a 180° turn which places the flat surface 23 of the nose section 17 against the snag 43. When the lure 15 is on its back the nose section 17 extends in an upward direction to expose the front surface 23 thereof to the action of the water being traversed whereby the lure tends to be raised toward the surface of the water. This raising or floating action is supplemented by the tendency of the tail section 18 to float. In this position, as shown in FIGS. 11 and 12, the body 16 holds the hooks 21 and 22 above the lower level thereof and has an upward and forward action which carries the hooks 21 and 22 above the snag 43 thereby preventing the fouling of the lure. The planing action of the nose section 17 moves the tail section 18 upward as the lure is pulled across the snag 43. After the tail section has cleared the snag 43 the weight of the hook means 21 and 22 being above the line of draft of the fish line 42 will rotate the lure back to its normal position as shown in FIGS. 6 and 7.

In summary the fish lure has a literally wiggling and dodging action which advantageously attracts game fish. The lure can be effectively retrieved and trolled in waters having obstacles as the lure has a unique roll-over action which moves the hooks thereof out of the path of the obstacle thereby preventing the hooks from being imbedded in the obstacle and fouling the lure.

It is to be understood that other modifications, within the scope of the appended claims, may be made in the design and arrangement of parts without departing from the spirit of the invention.

I claim:
1. A fish lure comprising:
   (a) a body having a forward section of a generally flattened elliptical shape in transverse cross section with substantially flat and parallel top and bottom surfaces and convex curved side walls which converge rearwardly symmetrically along a longitudinal axis,
   (b) the leading edge of said forward section having a convex shape,
   (c) a rear section of a frustrum shape having a circular end wall and a longitudinal axis at an angle of about 45° to 55° with respect to the longitudinal axis of the forward section, the diameter of said end wall being substantially equal to the width of said forward section adjacent said leading edge,
   (d) a curved mid-section connecting the forward section with the rear section, of an elliptical shape in transverse cross section with the major diameter smaller than the diameter of said circular end wall of the rear section and extended in the direction of the transverse dimension of the forward section,
   (e) line attachment means secured to the flat top surface of the forward section of said body, and
   (f) hook means depending from the circular end wall of the rear section and also from a bottom portion of the mid-section of the body.

2. The body of a fish lure comprising:
   (a) a nose section having a generally flattened elliptical shape in transverse cross section with substantially flat and paralled top and bottom surfaces, and convex curved side walls which converge rearwardly symmetrically along a longitudinal axis,
   (b) the leading edge of said nose section having an arcuate convex shape,
   (c) a tail section having a frustrum shape and a circular end wall with the longitudinal axis thereof positioned at an angle of about 45° to 55° with respect to the longitudinal axis of the nose section, the diameter of said end wall being substantially equal to the width of said nose section adjacent the leading edge thereof, and
   (d) a curved back section connecting the nose section with the tail section, having an elliptical-shaped transverse cross section with the major diameter smaller than the diameter of said circular end wall and extended in the direction of the transverse dimension of the nose section.

References Cited in the file of this patent
UNITED STATES PATENTS

| | | |
|---|---|---|
| D.142,160 | Baldwin | Aug. 14, 1945 |
| D.152,243 | DeBay | Jan. 4, 1949 |
| D.167,636 | Kautzky | Sept. 2, 1952 |
| 1,813,722 | Wright et al. | July 7, 1931 |
| 2,179,018 | Weidenmier | Nov. 7, 1939 |
| 2,517,925 | Pugh | Aug. 8, 1950 |
| 2,621,439 | Leidel | Dec. 16, 1952 |
| 2,756,534 | Cash | July 31, 1956 |
| 2,783,578 | Moore | Mar. 5, 1957 |